(12) United States Patent
Konno et al.

(10) Patent No.: US 8,465,385 B2
(45) Date of Patent: *Jun. 18, 2013

(54) CHAIN GUIDE MECHANISM

(75) Inventors: Masahiko Konno, Osaka (JP); Kaori Mori, Osaka (JP); Tatsuya Konishi, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 261 days.

This patent is subject to a terminal disclaimer.

(21) Appl. No.: 12/980,661

(22) Filed: Dec. 29, 2010

(65) Prior Publication Data

US 2011/0183797 A1 Jul. 28, 2011

(30) Foreign Application Priority Data

Jan. 28, 2010 (JP) ................................. 2010-016591

(51) Int. Cl.
*F16H 7/08* (2006.01)
*F16H 7/18* (2006.01)
*F01L 1/02* (2006.01)
*F01L 1/46* (2006.01)

(52) U.S. Cl.
USPC ............................ 474/111; 474/101; 474/140

(58) Field of Classification Search
USPC ................... 474/111, 140, 101, 109
See application file for complete search history.

(56) References Cited

U.S. PATENT DOCUMENTS

| 1,108,085 | A  | * | 8/1914  | Sewall ........................... 474/109 |
| 6,106,423 | A  | * | 8/2000  | White et al. ................... 474/109 |
| 6,743,131 | B1 | * | 6/2004  | Walker ........................... 474/134 |
| 7,097,579 | B2 | * | 8/2006  | Markley ......................... 474/111 |
| 7,390,276 | B2 | * | 6/2008  | Tryphonos .................... 474/109 |
| 7,815,533 | B2 | * | 10/2010 | Vrsek et al. ................... 474/111 |
| 2011/0077114 | A1 | * | 3/2011 | Markley ....................... 474/111 |

FOREIGN PATENT DOCUMENTS

JP             11-063128          3/1999

OTHER PUBLICATIONS

U.S. Appl. No. 12/915,226, filed Oct. 28, 2010 on Chain Guide Mechanism.

* cited by examiner

*Primary Examiner* — Sang Kim
*Assistant Examiner* — Dorin Cojocariu
(74) *Attorney, Agent, or Firm* — Howson & Howson LLP

(57) ABSTRACT

In a chain guide mechanism in which a pair of chain guides, at least one of which is a pivoted guide, are connected by mounting bosses a bridge so that the chain guides and bridge can be preassembled along with a chain and driving sprocket to form an integrated unit for installation in an engine, the chain guides include a chain-engaging guiding surface extending in a first direction from a location adjacent the mounting bosses, and a chain pressing portion extending in a second direction, opposite the first direction, substantially from the same location adjacent the mounting bosses. The pressing surfaces clamp the chain against the sprocket when a pivotable chain guide is rotated so that its chain engaging surface is moved away from the chain.

12 Claims, 19 Drawing Sheets

FIG.17A
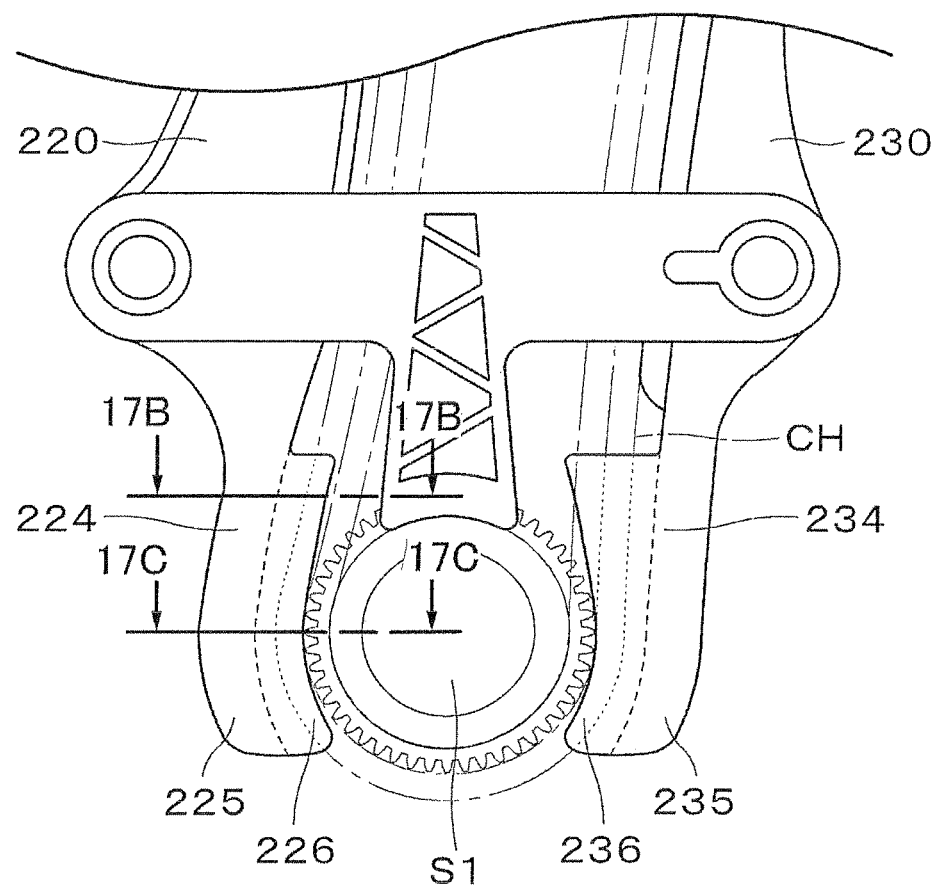
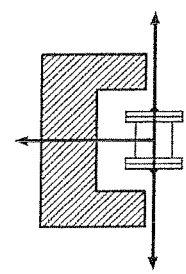
FIG.17B
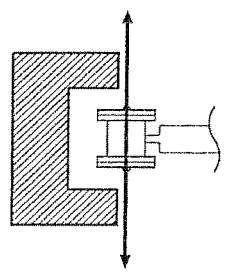
FIG.17C

PRIOR ART

PRIOR ART

PRIOR ART

CHAIN GUIDE MECHANISM

CROSS REFERENCE TO RELATED APPLICATIONS

This application claims priority on the basis of Japanese Patent Application, filed on Jan. 28, 2010. The disclosure of Japanese Patent Application 2010-016591 is herein incorporated by reference.

FIELD OF THE INVENTION

This invention relates to a chain guide mechanism comprising a plurality of chain guides for sliding engagement with a chain, and a guide bridge for holding the chain guides. The invention relates more specifically to a chain guide mechanism for use in an engine timing drive to guide and maintain tension in an endless timing chain such as a silent chain, a roller chain, or the like engaged in driven relationship with a crankshaft sprocket and in driving relationship with one or more camshaft sprockets within a timing drive compartment formed between an engine block and a timing chain cover.

BACKGROUND OF THE INVENTION

FIG. 18 shows a known engine timing drive composed of a chain guide mechanism, a driving sprocket S1 mounted on a crankshaft, a pair of driven sprockets S2 and S3 mounted on valve-operating camshafts, an endless timing chain CH engaged with the driving and driven sprockets, a pivoting chain guide 520 for guiding and keeping adequate tension in the timing chain, a tensioner T for exerting a force pressing the guide 520 against the span of the chain traveling from the driving sprocket S1 to driven sprocket S2, and a fixed chain guide 530 in sliding engagement with the span of the chain traveling from driven sprocket S3 to driving sprocket S1 for guiding the travel of the chain. The timing drive is typically disposed within a timing drive compartment (not shown) formed by an engine block and a timing chain cover.

The pivoted chain guide 520 is pivotably mounted on a mounting shaft B fixed to the engine block, and the fixed chain guide 530 is attached to the engine by mounting shafts B3 and B4, which are also fixed to the engine block. In assembly of the timing drive, and in disassembly of the timing drive for maintenance or replacement, the driving sprocket S1, the driven sprockets S2 and S3, the pivoting chain guide 520, the fixed chain guide 530, and the timing chain C, need to be mounted or dismounted individually. Consequently the process of assembly and disassembly is difficult and time-consuming.

To alleviate the aforementioned difficulties in assembly and disassembly of a timing drive, another known timing system has been provided in which the pivoted and fixed chain guides are connected by a guide bridge. As shown in FIG. 19, in the chain guide mechanism of this known timing system, the fixed chain guide 630 is formed as a unit with a guide bridge 610. A mounting hole 612, located adjacent an end of the guide bridge 610 remote from the fixed guide 630, receives a mounting boss 621 on a pivoted guide 620, which in turn receives a mounting shaft B on the engine block. The mounting shaft B, the boss 621, and the mounting hole 612, form a fulcrum about which the guide 620 pivots.

The guide bridge 610 is formed so that it defines the relative positions of the driving sprocket S1, the driven sprockets S2 and S3 and the pivoting chain guide 620. The positioning of these components during assembly or maintenance is thereby simplified. A provisional assembly can be made before the components are mounted on the engine, as shown and explained in Japanese laid-open Patent Application No. Hei. 11-63128.

While the known chain guide mechanism in FIG. 19 integrates the pivoting chain guide 620 and the fixed chain guide 630, it only defines the relative positional relationships of the driving sprocket S1, the driven sprockets S2 and S3, and the timing chain C. It does not integrally hold the sprockets and chain. Consequently, the improvements afforded by the guide bridge 610 are relatively minor.

Another problem with the guide bridge 610 is that, because the part thereof that connects the fixed and pivoted guides extends across the timing chain only on the side of the timing chain CH remote from the engine block, the mounting hole 612 can become disconnected from the boss 621 of the pivoting guide 620 if the guide bridge 610 is deformed in the direction of its thickness, as shown in FIG. 20.

SUMMARY OF THE INVENTION

A general aim of the invention is to at solve the above-mentioned problems by providing a structurally simple chain guide mechanism in which a plurality of chain guides can be held integrally with one another along with a chain and a sprocket in order to achieve greater efficiency in the assembly or maintenance of an engine. It is also an aim of the invention to prevent the chain from dropping downward during assembly and to prevent the chain from disengaging from a sprocket when in operation.

The invention is a chain guide mechanism incorporated into a chain transmission comprising a driving sprocket, at least one driven sprocket, and an endless traveling transmission chain engaged respectively in driven and driving relationship with the sprockets. The chain guide mechanism, comprises two chain guides in sliding relationship with the chain and a guide bridge for integrally holding the chain guides. Each chain guide has a mounting portion and a pair of coaxial cylindrical mounting bosses extending in opposite directions from the mounting portion. Each chain guide also has a chain-engaging guiding surface extending in a first direction from a location adjacent its mounting bosses, and a chain pressing portion extending from that location in a second direction, opposite the first direction. The chain pressing portion is positioned in spaced relationship to the chain, whereby a gap is maintained between the pressing portion and the chain when the chain transmission is in operation. The guide bridge has a base portion, and a pair of arms extending from the base portion. Each of the arms comprises two opposed, spaced, parts extending on opposite sides of the mounting portion of one of the chain guides, whereby the mounting portion is disposed between the opposed parts of the arms. The opposed, spaced, parts are formed with guide-mounting holes for receiving the mounting bosses on the mounting portion between them. The base portion of the guide bridge extends from the portion between the arms at a location such that the guide bridge is substantially in the shape of T, and includes a sprocket pressing portion in sliding contact with one of the sprockets.

Because the chain guides are sandwiched between the spaced parts of the arms that extend from the base portion, the arms can be shortened, their deformation can be reduced, and the guide mounting holes can be prevented from being disengaged from the mounting bosses. In addition, by integrating the chain guides with the bridge, and also by integrating the chain guide, bridge, and the chain as a pre-assembled unit, the chain guide mechanism of the invention facilitates and simplifies assembly.

Furthermore, because the base portion of the guide bridge extends from the portion between the arms forming a T, and the sprocket presser portion that contacts the sprocket is provided at the end of the base portion, it is also possible to hold the sprocket integrally with the chain guides and the chain in a pre-assembled unit, thereby achieving still greater efficiency in the assembly process.

Where the chain pressing portions are adjacent the driving sprocket, the chain pressing portion of each chain guide can extend through an imaginary plane in which the axis of rotation of the driving sprocket lies, and a part of each chain pressing portion facing the chain can have a concave curvature. With this embodiment, the chain pressing portions of the chain guide can press the chain against the sprocket in the pre-assembled unit and prevent the chain from disengaging the sprocket during assembly, thereby further improving the efficiency of the assembly process.

Preferably, the gap between the pressing portion and the chain is substantially uniform when the chain-engaging guiding surfaces are in sliding engagement with the chain while the chain transmission is in operation. The chain pressing portions, which partly surround the sprocket and are spaced from the chain by a substantially uniform gap, can also prevent the chain from floating and disengaging the sprocket during operation.

According to another aspect of the invention, the profile of the tip of each chain pressing portion, as seen along a line extending through the pressing portions of both chain guides, is tapered. The tapered configuration of the tips of the chain pressing portions facilitates smooth insertion of the chain guide mechanism into an engine during assembly and maintenance.

According to still another aspect of the invention, the chain pressing portion of each of the chain guides has side walls spaced from each other along a direction parallel to the axis of rotation of the adjacent sprocket, and a part of the chain is disposed between the side walls of each chain pressing portion. The side walls of the chain pressing portions restrict widthwise displacement of the chain, thereby further facilitating assembly and installation of the chain guide mechanism. The side walls of the chain pressing portions can also restrict widthwise deviation of the chain during operation.

BRIEF DESCRIPTION OF DRAWINGS

FIG. 17A is a fragmentary elevational view showing chain pressing portions of an assembled chain guide mechanism according to a second embodiment of the invention;

FIGS. 17B and 17C are sectional views taken respectively on section planes 17B-17B and 17C-17C in FIG. 17A;

DETAILED DESCRIPTION OF THE PREFERRED EMBODIMENTS

Figure 1:
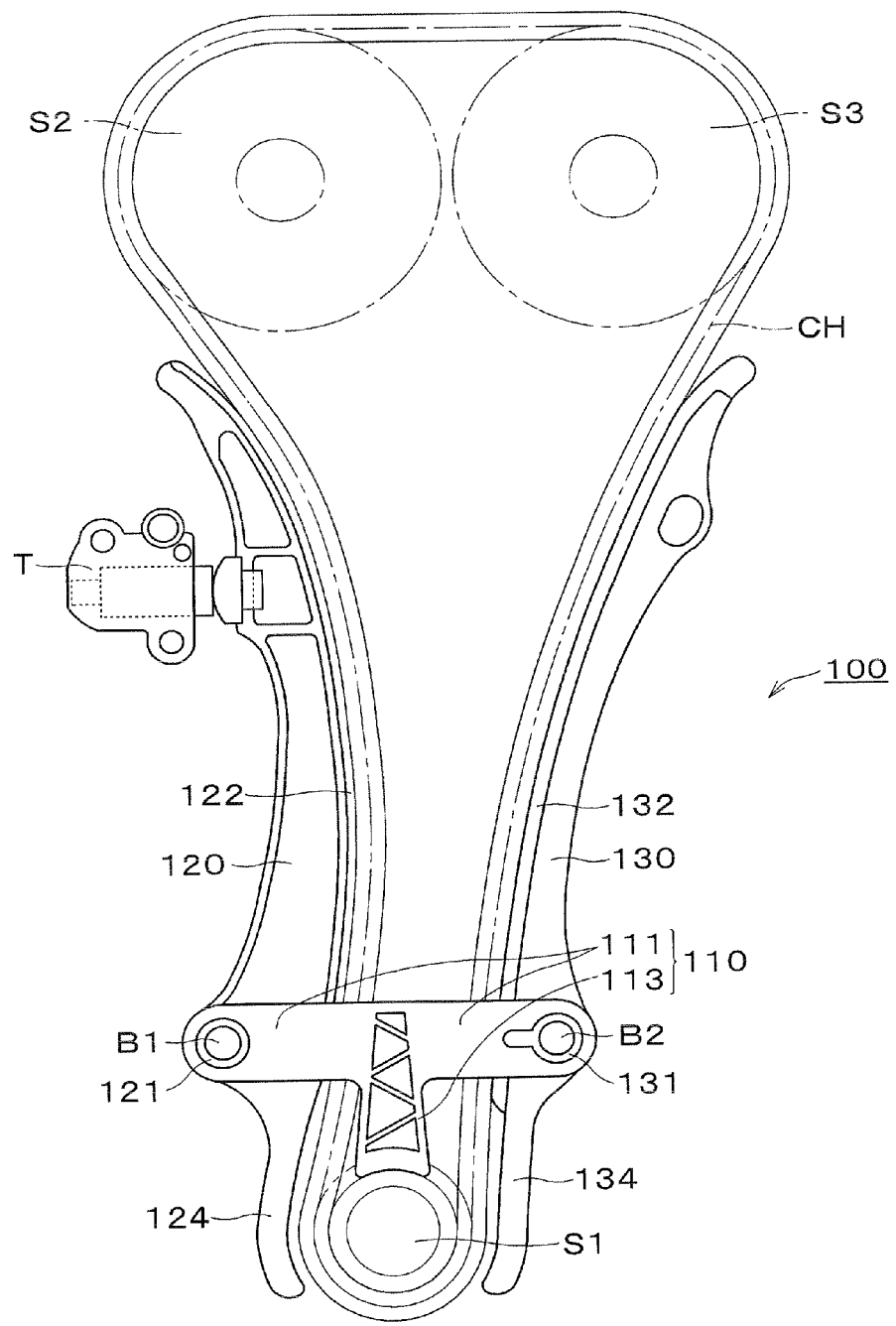
FIG. 1 is a schematic elevational view of an engine timing drive incorporating a chain guide mechanism according to the invention.

FIG. 1 shows a chain guide mechanism 100 according to the invention used in an engine timing drive, in which an endless timing chain CH is driven by a crankshaft sprocket S1 and in driving relationship with pair of camshaft sprockets S2 and S3.

The chain guide mechanism 100 includes a guide bridge 110 having two arms 111, to which are attached a pivoted chain guide 120 and a fixed chain guide 130. A bottom surface of a base portion 113 of the guide bridge 110 is in close relationship with the driving sprocket S1. The chain guide mechanism 100 is fixed to the engine by insertion of mounting shafts B1 and B2 into cylindrical mounting bosses 121 and 131 of the respective chain guides 120 and 130.

Figure 2:
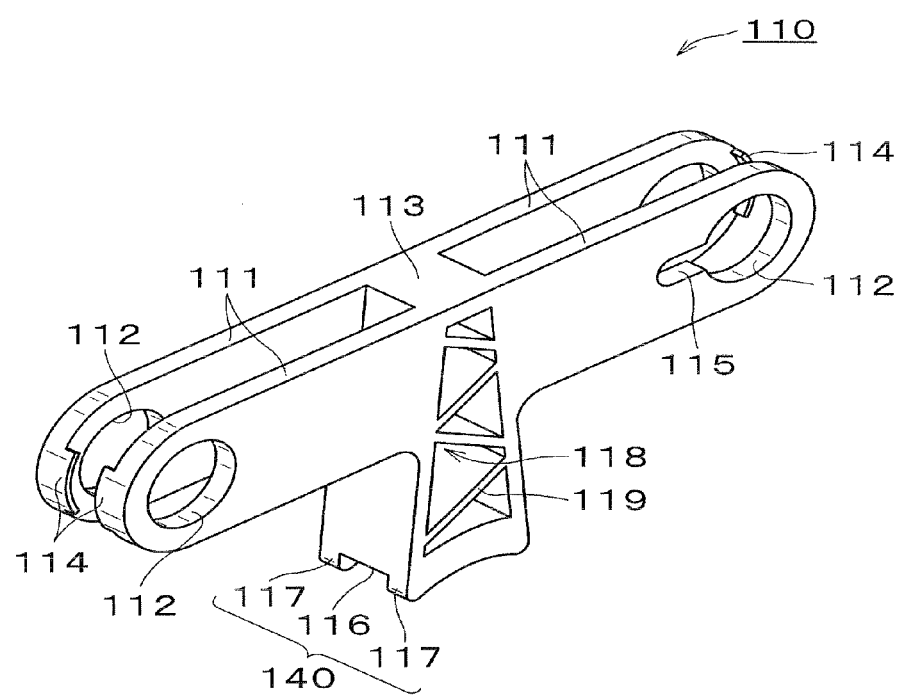
FIG. 2 is a perspective view of a guide bridge of a chain guide mechanism according to one embodiment of the invention.

As shown in FIG. 2, the guide bridge 110 is formed so that each of its arms consists of two opposed, spaced parts 111, which extend in parallel relation to each other from the base portion 113. Guide mounting holes 112 are provided at the ends of the arms. The guide mounting holes 112 in both of the opposed, parallel portions of each arm are aligned with each other.

Each of the guide mounting holes 112 to which the fixed chain guide 130 is mounted is provided with a notch 115. Both parts 111 of each arm are provided with projections 114 that protrude toward each other and are located The projections are located adjacent the sides of the mounting holes 112 near the outer ends of the arms. The purpose of these projections 114 is to assist the bushings 121 and 131, and their cooperating mounting holes 112, in preventing the chain guides 120 and 130 from deviating outward in directions opposite to the directions in which their chain travel guiding surfaces 122 and 132 face.

The base portion 113 of the guide bridge 110 extends from the center of the portion consisting of the arms so that the bridge is in the form of a T. The base portion is provided at its end with a sprocket-pressing structure 140, composed of a groove 116 that permits sprocket teeth to pass, and sliding contact portions 117, on both sides of the groove 116, that slidably contact boss portions of the sprocket. The weight of the base portion 113 is reduced without reducing its strength by forming it with an opening 118 reinforced by ribs 119.

Figure 3:
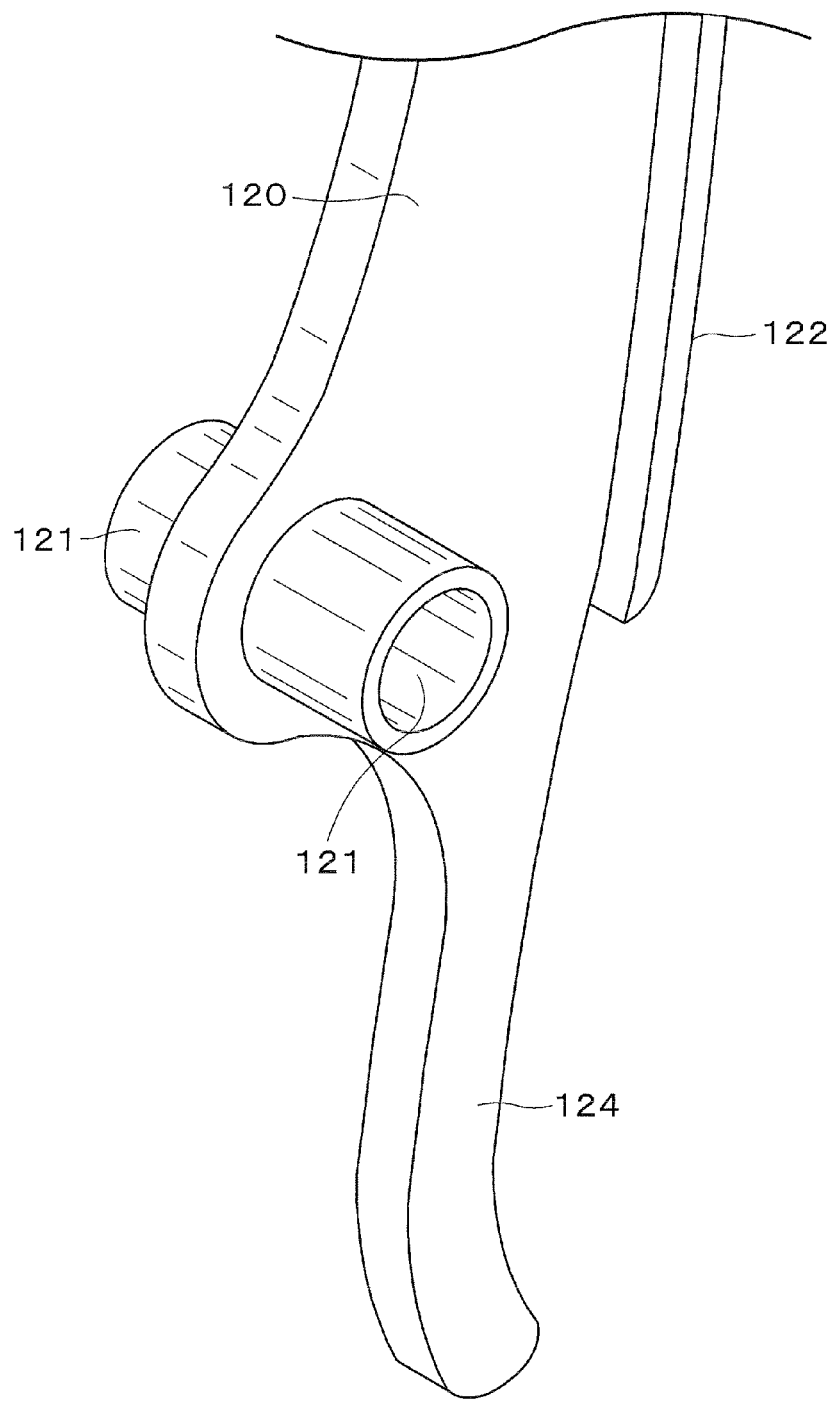
FIG. 3 is a fragmentary perspective view showing the mounting boss and the chain pressing portion of a pivoting chain guide of the chain guide mechanism according to one embodiment of the invention.

As shown in FIG. 3, the pivoting chain guide 120 is provided with cylindrical mounting bosses 121 that protrude widthwise in opposite directions along the pivot axis of the guide. The guide 120 is also provided with a chain travel guiding surface 122 extending upward in the figure from a location adjacent the mounting bosses 121, and a chain pressing portion 124 extending in the opposite direction substantially from the same location adjacent the mounting bosses. The pivoting chain guide 120 is sandwiched between the opposed parts 111 of one of the arms and pivotably held by the guide bridge 110 by engagement of the mounting bosses 121 of the guide with the mounting holes 112 of the bridge 110.

Figure 4:
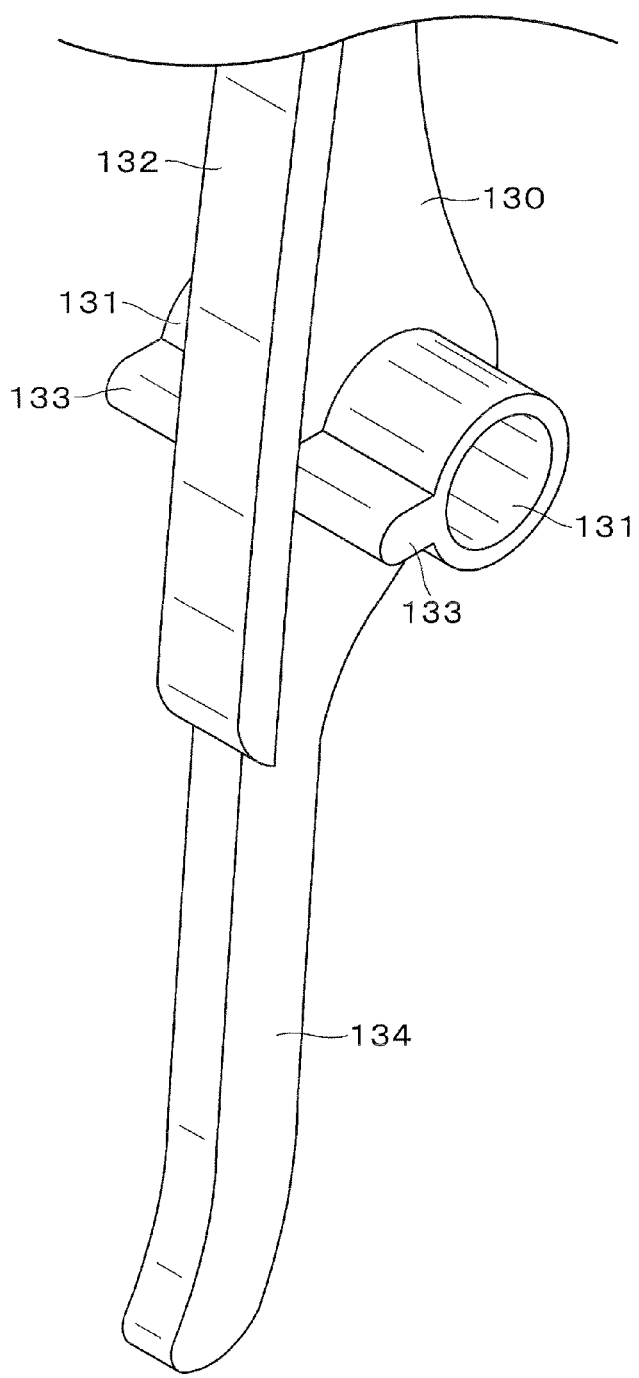
FIG. 4 is a fragmentary perspective view showing the mounting boss and the chain pressing portion of a fixed chain guide of the chain guide mechanism according to one embodiment of the invention.

As shown in FIG. 4, the fixed chain guide 130 is provided with cylindrical mounting bosses 131 that protrude widthwise in opposite directions. The mounting bosses 131 are in the form of hollow circular cylinders having projections 133 on the outer circumferences of the circular cylinders. The chain guide 130 is also provided with a chain travel guiding surface 132 which extends upward in FIG. 4 from a location adjacent the mounting bosses 131, and a chain pressing portion 134 which extends in the opposite direction from substantially the same location.

The fixed chain guide 130 is sandwiched between the opposed parts 111 of one of the arms and is held in fixed relationship to the guide bridge 110 by engagement of its mounting bosses 131 with guide mounting holes 112 of the bridge and with its projections 131 in mating relationship with notches 115 in the bridge.

The guide deviation-preventing projections 114, provided in each arm of the guide bridge 110 prevent the chain guides 120 and 130 from deviating relative to the bridge in the widthwise direction of the guides, i.e., in the direction in which the arms extend.

Figure 5:
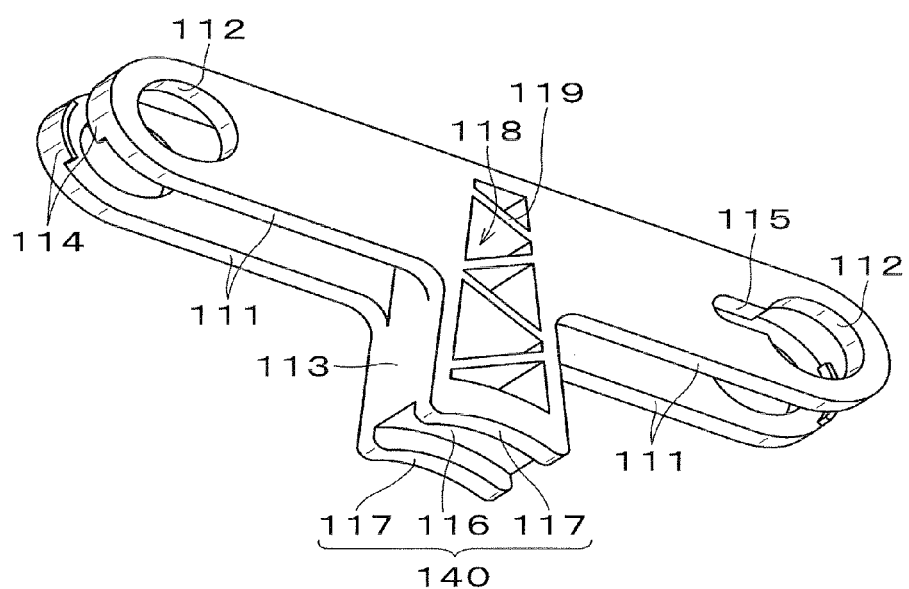
FIG. 5 is a perspective view showing the sprocket presser portion of the guide bridge in FIG. 2.
Figure 6:
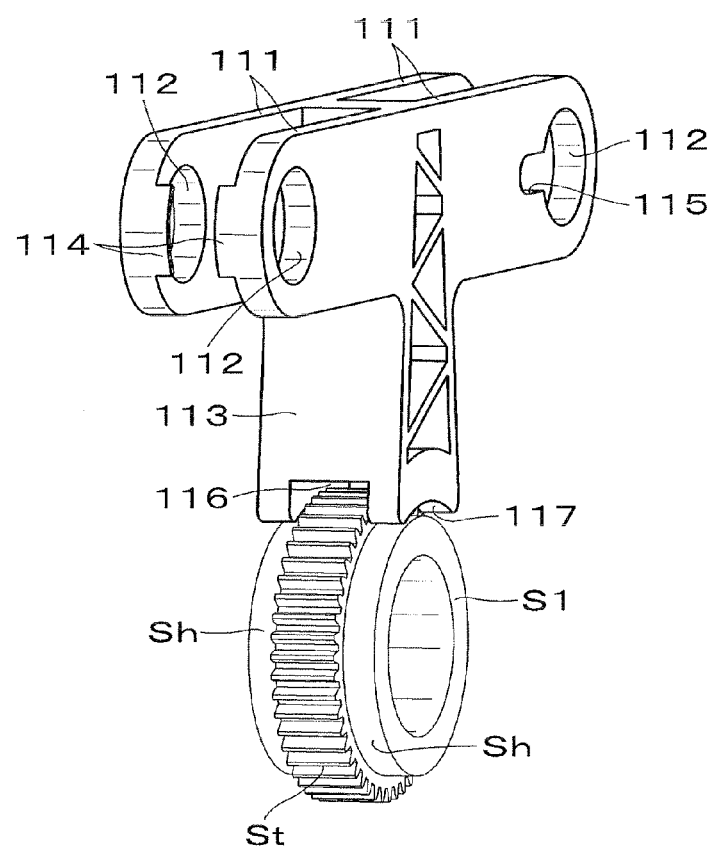
FIG. 6 is a perspective view showing the sprocket presser portion of the guide bridge in FIG. 2 in cooperation with a sprocket.
Figure 7:
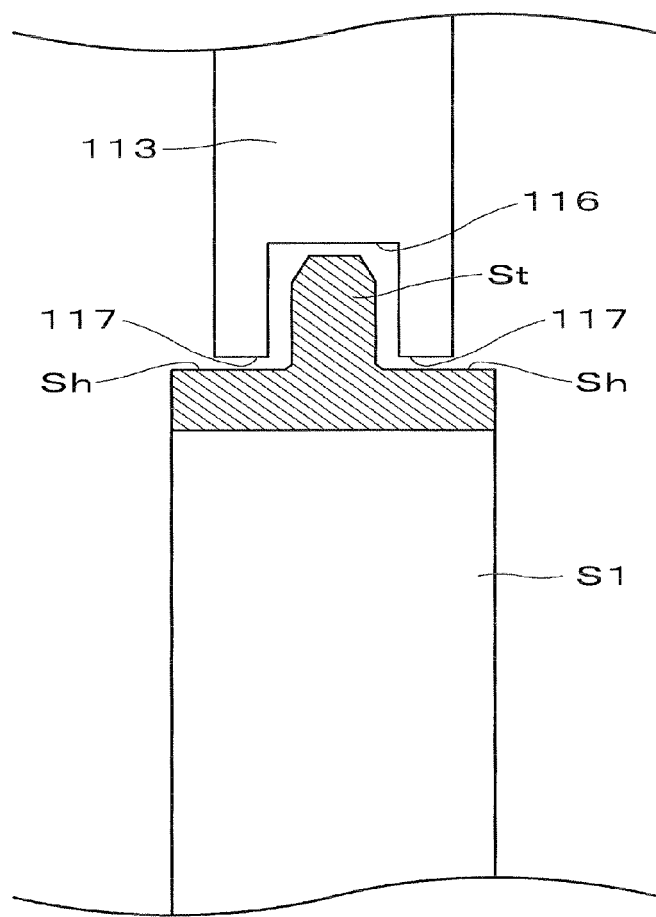
FIG. 7 is a fragmentary sectional view of the sprocket presser portion of the guide bridge and the sprocket in FIG. 6.

As shown in FIGS. 5 through 7, groove 116 in the sprocket presser portion 140 at the end of the base portion 113 of the guide bridge 110 permits teeth St of the driving sprocket S1 to pass, while its sliding contact portions 117 on both sides of the groove 116 slidably contact boss portions Sh of sprocket S1. The sprocket presser portion of the guide bridge 110 makes it possible to handle the chain guide mechanism 100 integrally with the driving sprocket S1 during assembly and maintenance by abutting the sliding contact portions 117 with the boss portions Sh of the driving sprocket S1. The base portion 113, however, does not interfere with the driving sprocket S1 after the chain guide mechanism is installed on an engine.

Figure 8:
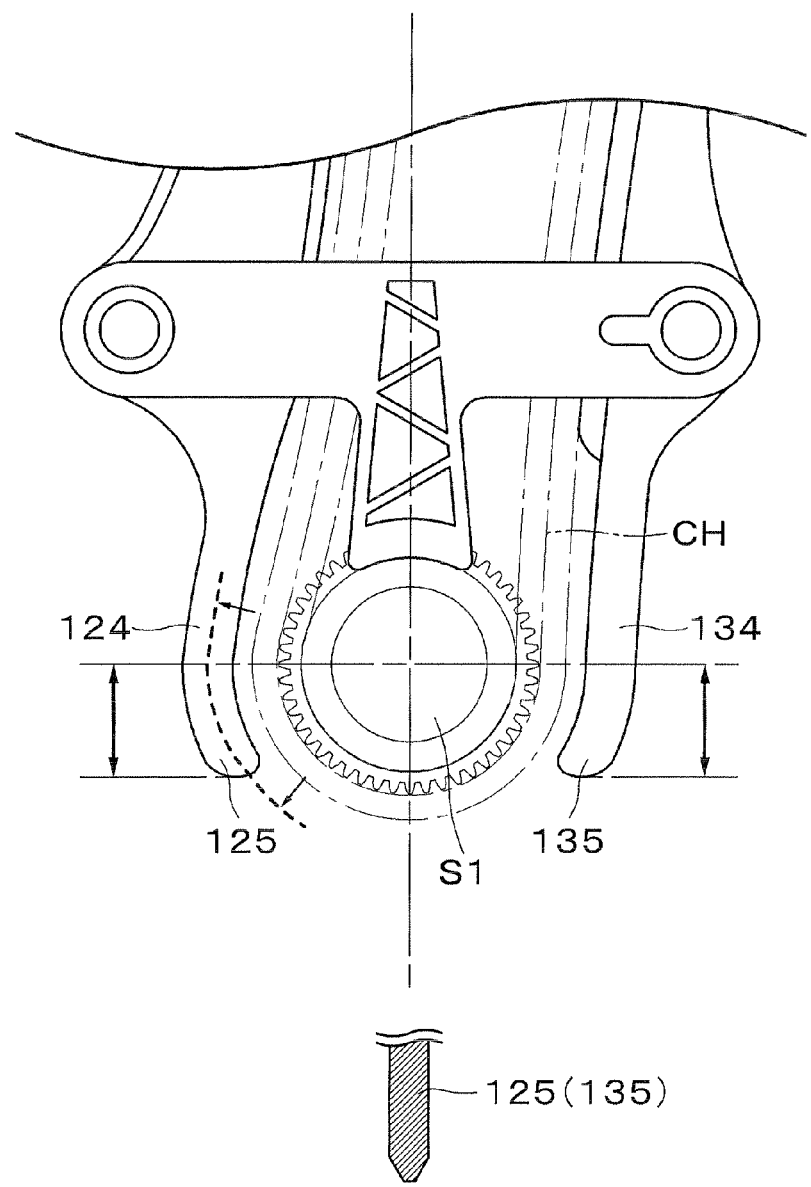
FIG. 8 is a fragmentary elevational view, showing the assembled chain guide mechanism of one embodiment of the invention, and includes an auxiliary view showing the tapered profile of the chain pressing portions of the guides.

As shown in FIG. 8, the chain pressing portions 124 and 134, of the pivoting chain guide 120 and the fixed chain guide 130 respectively, extend beyond the center of sprocket S1 around which the timing chain CH moves when the timing drive is in operation. That is, they both extend through an imaginary plane in which the axis of rotation of driving sprocket S1 lies. The chain-facing surfaces of the chain pressing portions are in the form of concave circular arcs, as seen in FIG. 8, and each chain pressing portion extends partway around the sprocket S1, and is spaced from the chain by a substantially uniform gap. The tip portions 125 and 135 of the chain pressing portions have a tapered profile when viewed along a line extending through the pressing portions of both chain guides. The tapered profile is shown in section in the auxiliary view in FIG. 8.

Figure 9:
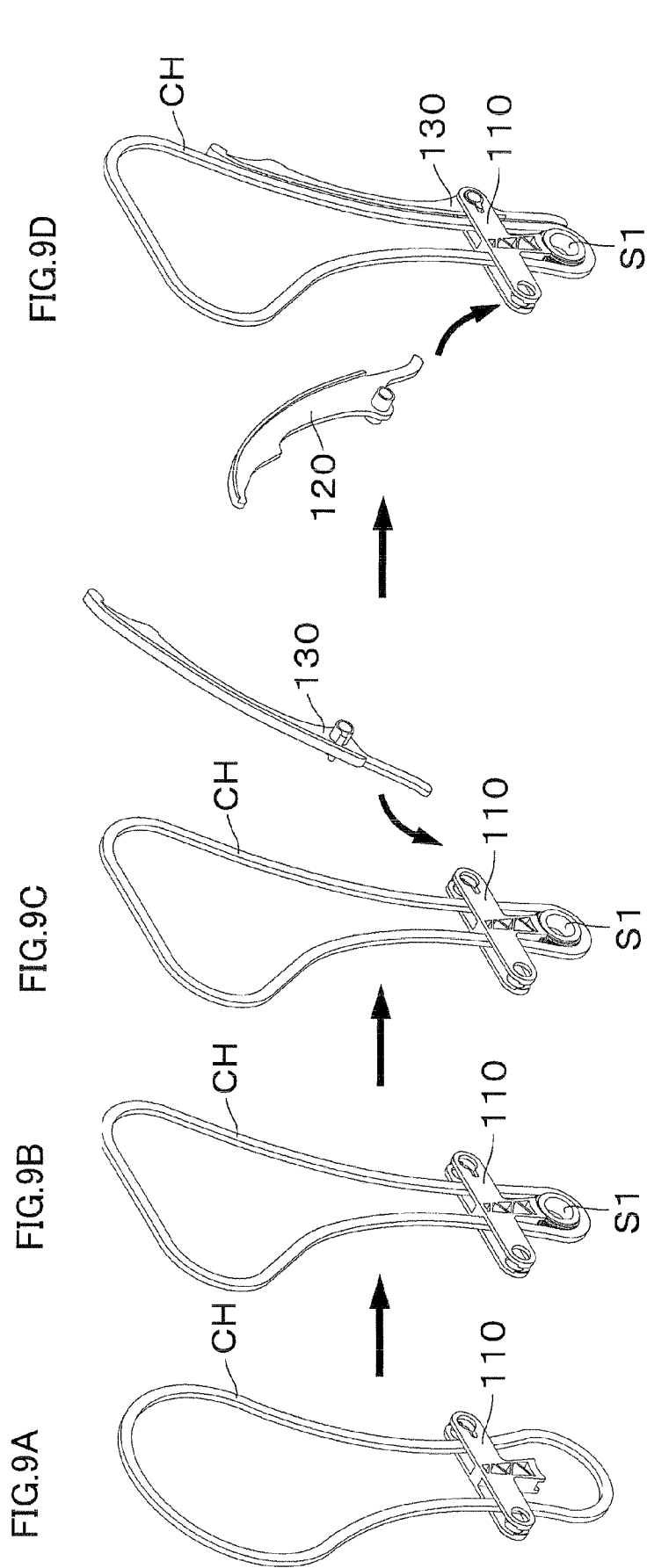
FIGS. 9A through 9D are schematic perspective views illustrating a first set of sequential steps in a procedure for assembly of the chain guide mechanism of one embodiment of the invention.

In the process of assembling the chain guide mechanism 100 and installing the same on an engine, the timing chain CH is first positioned so that opposite sides of the chain CH are inserted respectively between the opposed parts 111 of the arms of the guide bridge 110 on both sides of the base portion 113, as shown in FIG. 9A. Then, the driving sprocket S1 is engaged with the chain CH and brought into abutment with the sprocket presser portion 140 of the bridge 110 as shown in FIG. 9B. The timing chain CH holds the sprocket S1 against the base portion 113 of the guide bridge 110.

Next, the fixed chain guide 130 and the pivoting chain guide 120 are inserted between the end portions of opposed parts of the arms of the guide bridge 110, and the boss portions 131 and 121 of the guides 130 and 120 are engaged with the mounting holes 112 of the bridge 110 as shown in FIGS. 9C and 9D. The opposed elements 111 of the arms can be resiliently bent outward slightly to allow for insertion of the guides into the bridge 110.

Referring to FIGS. 4 and 5, the projections 133 of the mounting bosses 131 of the fixed chain guide 130 mate with notches 115 in the fixed guide mounting holes 112 to prevent rotation of the fixed the guide relative to the bridge.

Figure 10:
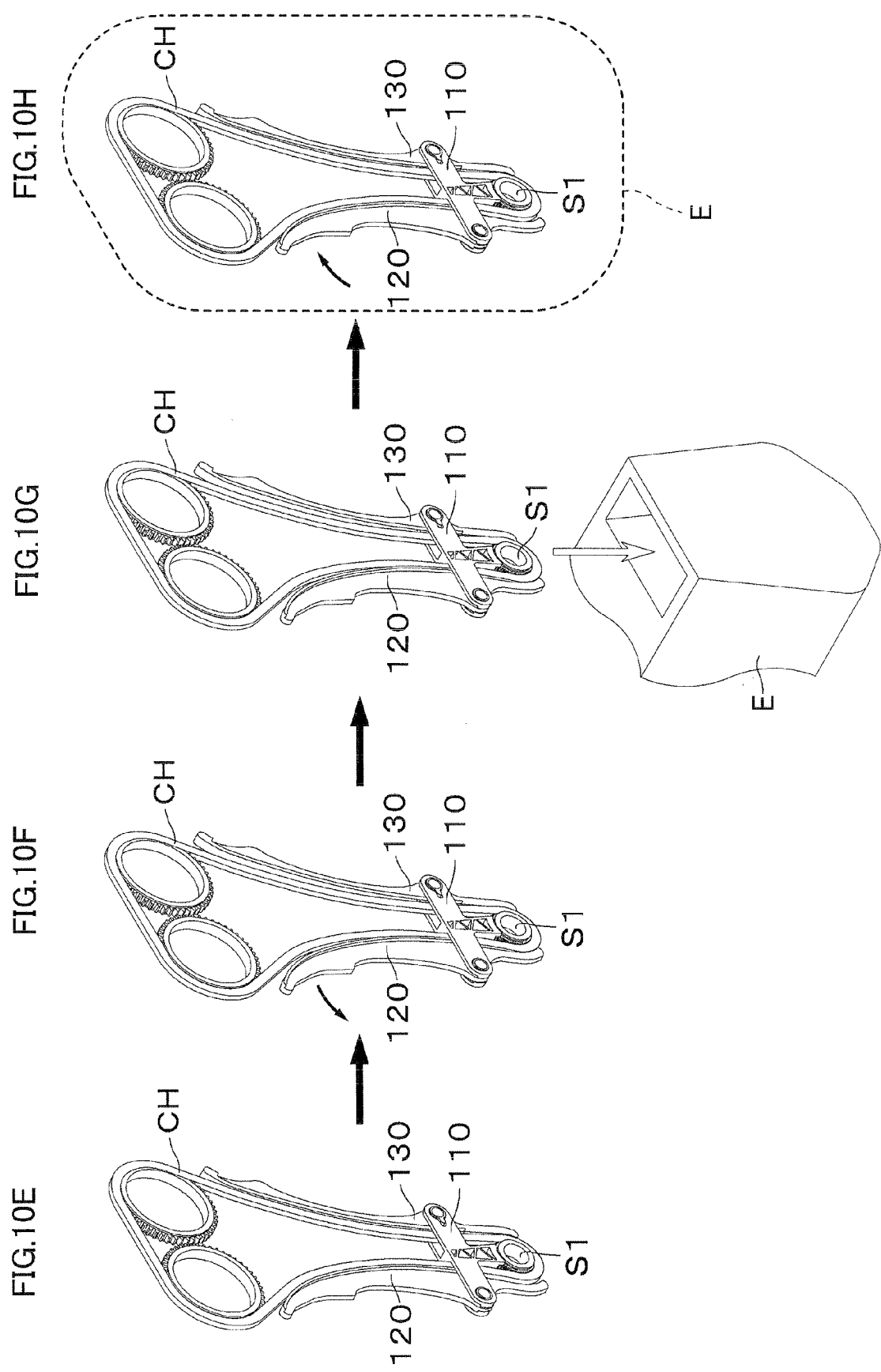
FIGS. 10E through 10H illustrate a subsequent set of sequential steps in the assembly of the chain guide mechanism the procedure, that follow the steps illustrated in FIGS. 9A-9D.
Figure 11:
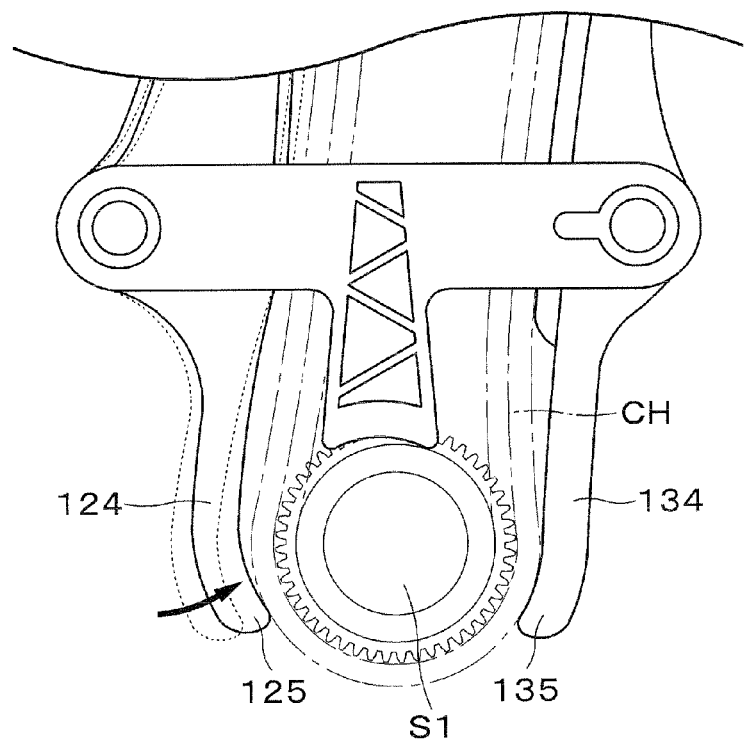
FIG. 11 is an enlarged fragmentary elevational view showing the assembled chain guide mechanism in FIGS. 10E and 10F.

With the guide bridge 110, the fixed chain guide 130 and pivoting chain guide 120, the timing chain CH, and the driving sprocket S1 integrated with one another as shown in FIG. 10E, the pivoting chain guide 120 is rotated about its pivot axis in a direction such that its chain travel guiding surface 122 separates from the chain CH as shown in FIGS. 10F and 11, while its chain pressing surface moves toward the driving sprocket S1. When the pivoting chain guide 120 is rotated in this manner, the driving sprocket S1 and the timing chain CH are clamped between the chain pressing portions 124 and 134 and held against by the sprocket presser portion 140. Thus, the guides 130 and 120, the guide bridge 110, the driving sprocket S1 and the timing chain CH are integrated into a rigid unit.

With the chain guide mechanism and the chain and driving sprocket integrated into a rigid unit it becomes easy to insert the unit into an engine E as shown in FIG. 10G. When the chain guide mechanism is incorporated into the engine E, the pivoting chain guide 120 is rotated about its pivot axis so that its chain guiding surface again moves into engagement the chain CH as shown in FIG. 10H, and gaps are reestablished between the chain pressing portions 124 and 134 and the timing chain CH. These gaps allow the chain to travel around the driving sprocket but are sufficiently small to prevent the timing chain from floating away from and disengaging the driving sprocket S1.

Figure 12:
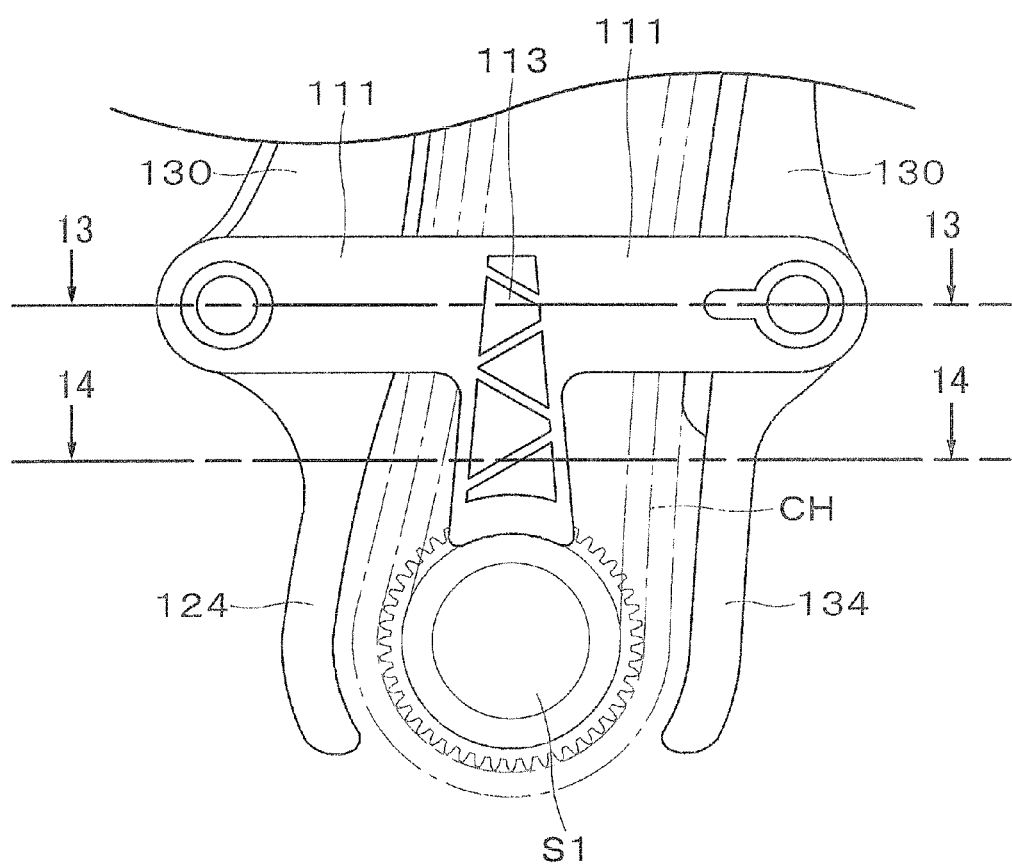
FIG. 12 is a schematic elevational view showing the assembly of the chain pressing portions of the chain guide mechanism.
Figure 13:
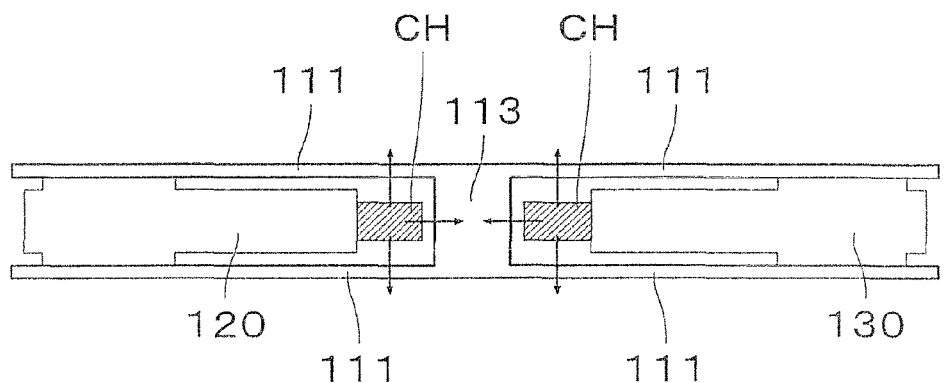
FIG. 13 is a section view of the chain guide mechanism in FIG. 12 taken on section plane 13-13.
Figure 14:
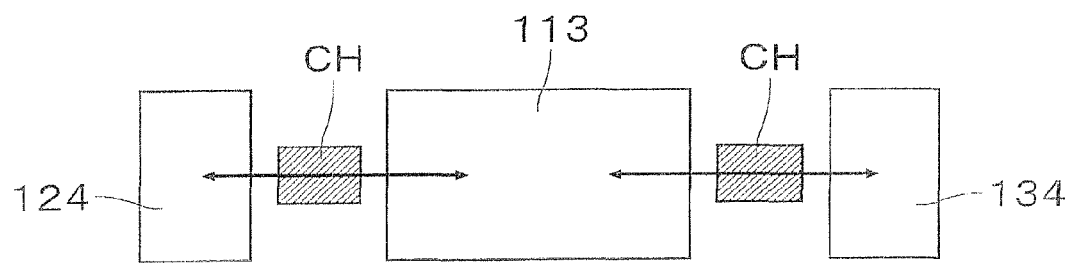
FIG. 14 is a section view of the chain guide mechanism in FIG. 12 taken on section plane 14-14.

As shown in FIGS. 12 through 14, the timing chain CH passes through within spaces created respectively on the both sides of the base portion 113 of the guide bridge 110, the spaces being defined by the base portion 113, the elements 111 of the arms of the guide bridge 110 and the chain-guiding surfaces 132 and 122 of the fixed chain guide 130 and the pivoting chain guide 120.

Vibration of the part of the timing chain CH below the guide bridge 110 is restricted by the base portion 113 of the guide bridge 110 and the chain pressing portion 134 of the fixed chain guide 130 and the chain pressing portion 124 of the pivoting chain guide 120. Accordingly, the base portion 113, the opposed elements 111 of the arms, the pivoting chain guide 120, the fixed chain guide 130, and the chain pressing portions 124 and 134, stabilize the travel of the timing chain CH, and can prevent the chain from floating or deviating from the guide mechanism even if the timing chain CH meanders or vibrates. The gaps shown in FIGS. 13 and 14 are exaggerated for the purpose of illustration. The shapes and sizes of the components are designed so that they steadily function as a chain guide.

Because the guide bridge 110 is positioned near the driving sprocket S1, it can be small in size, and manufactured readily, with improved dimensional accuracy. The guide bridge 110 does not cover the surfaces on which the chain slides, and does not hamper lubrication and heat radiation of the timing system. The pairs of spaced elements 111 of the arms on both sides of the base portion 113 are short and less subject to deformation, so accidental disengagement of the mounting bosses of the guides from the bridge 110 is avoided.

The distances between the guide mounting holes 112 and the projections 114 at the ends of the arms 111 may be different for the fixed chain guide 130 and the pivoting chain guide 120, and shapes of the guides around their mounting bosses may be different in order to prevent the chain guides from being installed incorrectly.

The directions in which the elements 111 of the arms extend on both sides of the base portion 113 are at right angles to the direction in which the base portion 113 extends toward the driving sprocket S1. However, the elements 111 of the arms can be disposed at other angles relative to the base portion 113. The elements 111 of the arms can also function as guides to control widthwise deviation of the chain, i.e., deviation of the chain from its plane of travel. To this end, the spacing of the elements 111 of arms can be set to be only slightly greater than the width of the chain, and the heights of the portions of the arms adjacent path of travel of the chain can be enlarged in the direction of travel of the adjacent portion of the chain. The arms can have distinct parts extending in the direction of travel of the adjacent parts of the chain.

Figure 15:
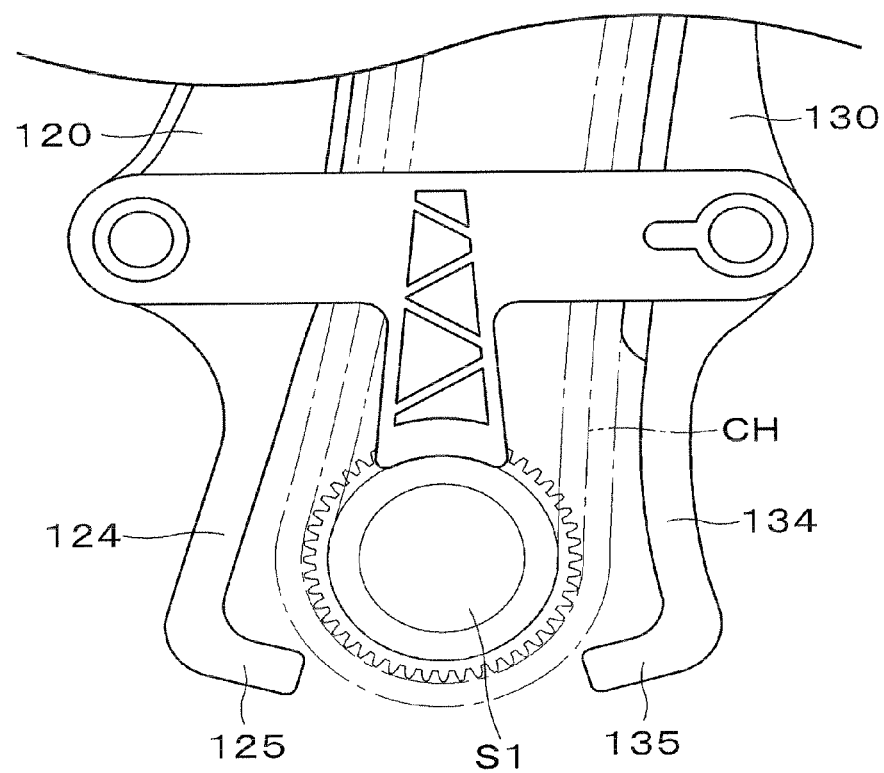
FIG. 15 is a fragmentary elevational view showing a modification of the chain pressing portions of the assembled chain guide mechanism.
Figure 16:
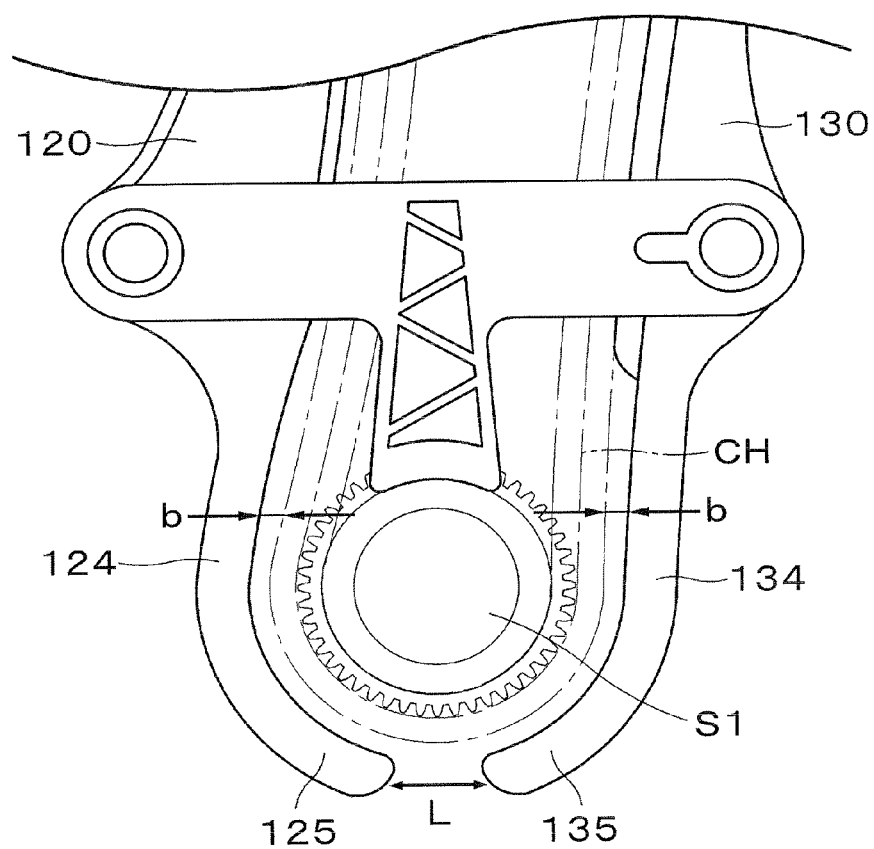
FIG. 16 is a fragmentary elevational view showing another modification of the chain pressing portions of an assembled chain guide mechanism.
Figure 18:
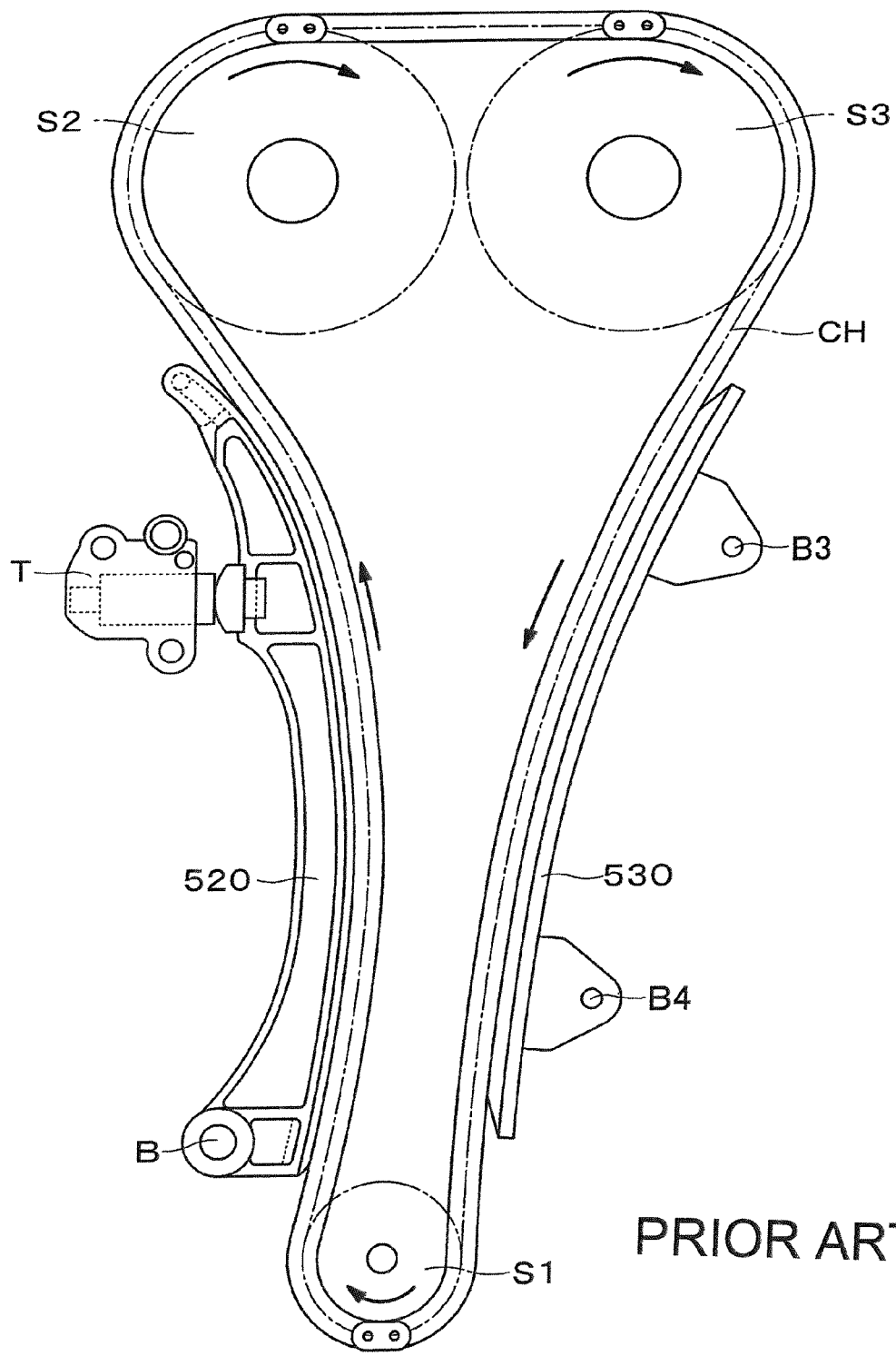
FIG. 18 is a schematic elevational view of an engine timing drive incorporating a prior art chain guide mechanism.
Figure 19:
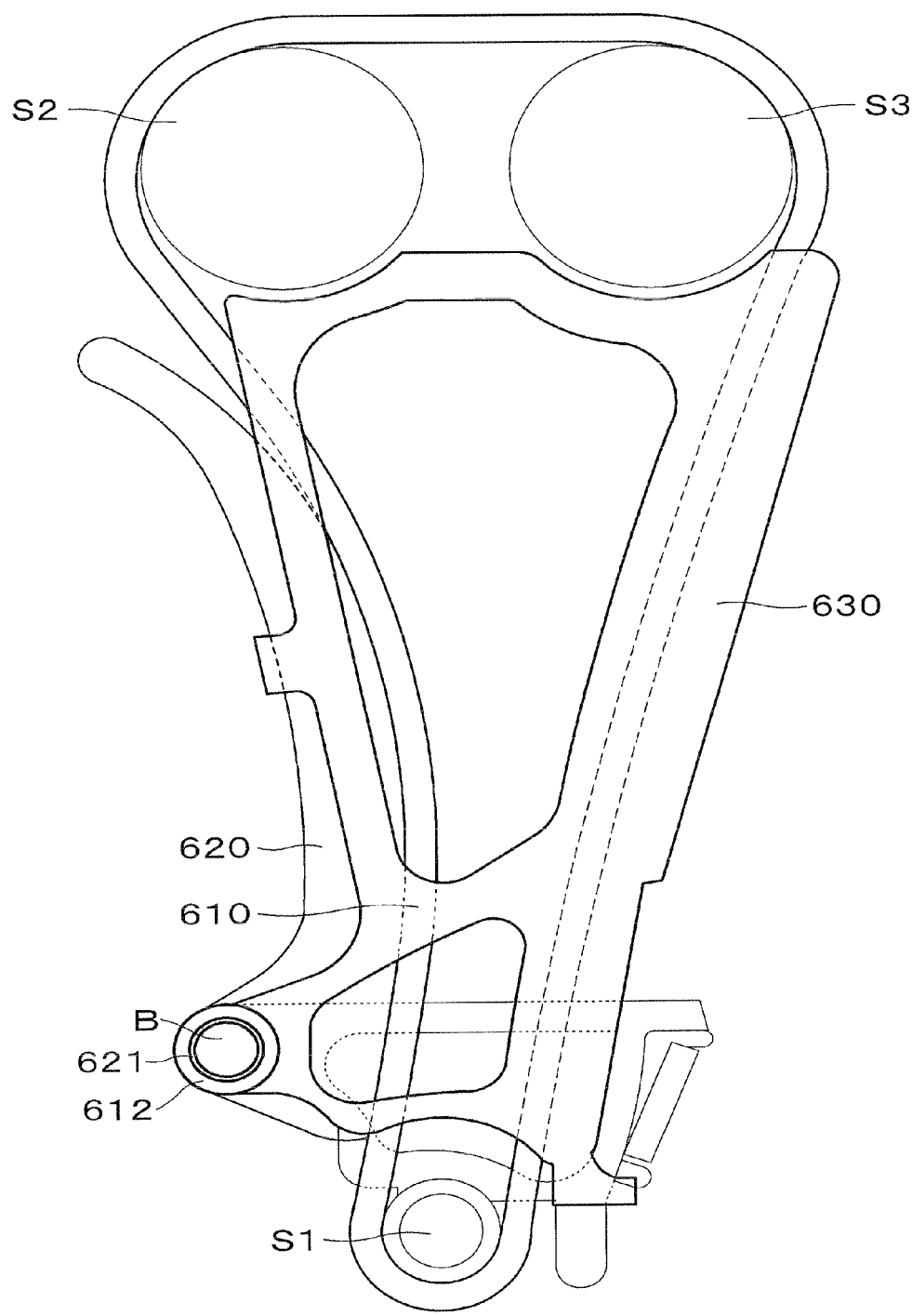
FIG. 19 is a schematic elevational view of an engine timing drive incorporating another prior art chain guide mechanism.
Figure 20:
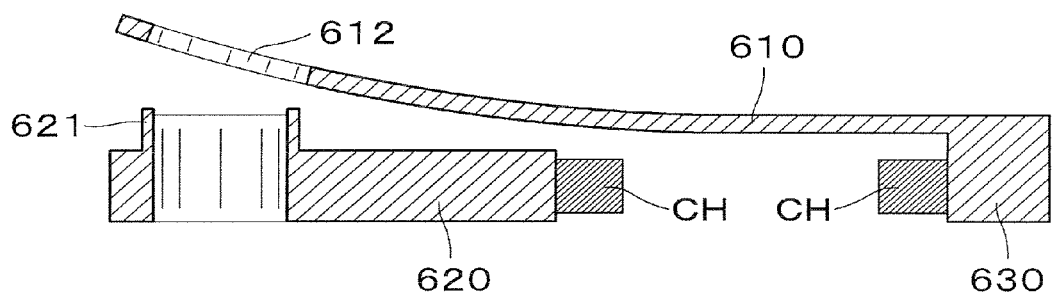
FIG. 20 is a cross-sectional view of the chain guide mechanism of FIG. 19.

While parts adjacent the tips 125 and 135 of the pressing portions 124 and 134 of the chain guides are in the form of circular arcs in order to maintain a substantially uniform gap between the chain pressing portions 124 and 134 and the chain, the chain pressing portions 124 and 134 may be formed into a bent shape so that the smallest gap is between the chain and the tip portions 125 and 135 as shown in FIG. 15. When the chain pressing portions 124 and 134 of the guides are arcuate in shape, the tip portions 125 and 135 can be extended farther around the sprocket S1 as shown in FIG. 16. In this case, if the gap L between the tips 125 and 135 is reduced to approximately two times the width of the gap b between the chain and chain pressing portions 124 and 134, it becomes possible to bring the tips of the chain pressing portions 124 and 134 nearly together and thereby cover almost completely the part of the timing chain CH in engagement with the sprocket S1 when the pivoting chain guide 120 is rotated about its pivot axis in a direction such that its chain travel guiding surface 122 separates from the timing chain CH. In this way, the driving sprocket S1 can be integrated more rigidly with the timing chain CH in the chain guide mechanism 100.

In the embodiment shown in FIGS. 17A-17C, side walls 226 and 236 are provided on the chain pressing portions 224 and 234 of the guides. These side walls 226 and 236 guide side portions of the timing chain CH on both sides of chain pressing portions 224 and 234. Otherwise, the chain guides are similar in structure and operation to the previously described embodiment and its variations.

The side guide walls 226 and 236 prevent the timing chain CH from dropping downward, and also restrict widthwise movement of the driving sprocket S1. Therefore, the components of the chain guide mechanism are held together more firmly, and assembly and maintenance of the chain guide mechanism can be carried out more efficiently.

The chain pressing potions 224 and 234 having side walls as in FIGS. 17A-17C can also restrict the timing chain CH from floating away from the driving sprocket S1 during operation, and at the same time restrict widthwise movement of the chain. Thus, in this embodiment, it is possible to more steadily prevent the timing chain CH from deviating from the driving sprocket S1.

The chain guide mechanism of the invention improves the efficiency of assembly and maintenance of the timing chain transmission by allowing the chain guides, the chain and the sprocket to be integrally held together by means of a simple structure.

The chain guide mechanism of the invention may take any of various forms, provided that it comprises plurality of chain guides in sliding relationship with the chain and a guide bridge for integrally holding the chain guides, and provided that each chain guide has a chain-engaging guiding surface and a chain pressing portion extending in opposite directions from a location adjacent its mounting bosses.

The plurality of chain guides of the chain guide mechanism of the invention may be pivoting chain guides for holding the tension, i.e., tensioner levers, or they may be fixed chain guides. The chain guiding surfaces on which the chain slides can be unitary molded parts of the guides, or may be in the form of shoes having favorable sliding properties. The shoes can be attached to and supported by guide bases.

The sliding surfaces of the chain guides may be formed of any material presenting low frictional resistance to the chain. Preferable materials exhibits durability in high-temperature environments and can achieve smooth sliding contact with a chain. Examples of suitable materials include synthetic resins such as polyamide 6, polyamide 46, polyamide 66, polyacetal resin, and the like.

Furthermore, because the guide bridge of the chain guide mechanism can contact the chain and is used integrally with the chain guides, it is desirably formed of a material that is durable in a high-temperature environment, that presents a low frictional resistance to the chain, and that can achieve smooth sliding contact with the chain. It is preferable to make the guide bridge from the same material used to make the chain engaging surfaces of the chain guides.

What is claimed is:

1. In a chain transmission comprising a driving sprocket, at least one driven sprocket, and an endless traveling transmission chain engaged respectively in driven and driving relationship with said sprockets, a chain guide mechanism, comprising:

two chain guides in sliding relationship with said endless traveling transmission chain; and a guide bridge for integrally holding the chain guides;

wherein each said chain guide has:

a pair of coaxial cylindrical mounting bosses extending in opposite directions from a mounting portion of the chain guide;

a chain-engaging guiding surface extending in a first direction from a location adjacent said mounting bosses; and a chain pressing portion extending in a second direction, opposite said first direction, from said location adjacent the mounting bosses, and positioned in spaced relationship to the chain whereby a gap is maintained between the pressing portion and the chain when the chain transmission is in operation; and wherein:

said guide bridge has a base portion, and a pair of arms extending from the base portion;

each of said arms comprises two opposed, spaced parts extending on opposite sides of the mounting portion of one of the chain guides whereby the mounting portion is disposed between said opposed, spaced parts;

each of said opposed, spaced parts is formed with a guide mounting hole for receiving a mounting boss on the mounting portion therebetween; and said base portion of said guide bridge extends from the portion between said arms at a location such that the guide bridge is substantially in the shape of T, and includes a sprocket pressing portion in sliding contact with one of said driving sprocket and said at least one driven sprocket.

2. The chain guide mechanism according to claim 1, wherein the profile of the tip of each said chain pressing portion as seen along a line extending through the pressing portions of both chain guides is tapered.

3. The chain guide mechanism according to claim 1, wherein the chain pressing portion of each of said chain guides has side walls spaced from each other along a direction parallel to the axis of rotation of said one of said driving sprocket and said at least one driven sprocket, and wherein a part of the chain is disposed between the side walls of each said chain pressing portion.

4. The chain guide mechanism according to claim 1, wherein said one of said driving sprocket and said at least one driven sprocket is the driving sprocket, and wherein the chain pressing portion of each said chain guide extends through an imaginary plane in which the axis of rotation of said driving sprocket lies, and a part of each said chain pressing portion facing the chain has a concave curvature.

5. The chain guide mechanism according to claim 4, wherein the profile of the tip of each said chain pressing portion as seen along a line extending through the pressing portions of both chain guides is tapered.

6. The chain guide mechanism according to claim 4, wherein the chain pressing portion of each of said chain guides has side walls spaced from each other along a direction parallel to the axis of rotation of said one of said driving sprocket and said at least one driven sprocket, and wherein a part of the chain is disposed between the side walls of each said chain pressing portion.

7. The chain guide mechanism according to claim 1, wherein said one of said driving sprocket and said at least one driven sprocket is the driving sprocket, and wherein the chain pressing portion of each said chain guide extends through an imaginary plane in which the axis of rotation of said driving sprocket lies, and a part of each said chain pressing portion facing the chain has a concave curvature, and wherein said gap between the pressing portion and the chain is substantially uniform when the chain-engaging guiding surfaces are in sliding engagement with the chain while the chain transmission is in operation.

8. The chain guide mechanism according to claim 7, wherein the profile of the tip of each said chain pressing portion as seen along a line extending through the pressing portions of both chain guides is tapered.

9. The chain guide mechanism according to claim 7, wherein the chain pressing portion of each of said chain guides has side walls spaced from each other along a direction parallel to the axis of rotation of said one of said driving sprocket and said at least one driven sprocket, and wherein a part of the chain is disposed between the side walls of each said chain pressing portion.

10. The chain guide mechanism according to claim 1, wherein the profile of the tip of each said chain pressing portion as seen along a line extending through the pressing portions of both chain guides is tapered, and wherein the chain pressing portion of each of said chain guides has side walls spaced from each other along a direction parallel to the axis of rotation of said one of said driving sprocket and said at least one driven sprocket, and wherein a part of the chain is disposed between the side walls of each said chain pressing portion.

11. The chain guide mechanism according to claim 1, wherein said one of said driving sprocket and said at least one driven sprocket is the driving sprocket, and wherein the chain pressing portion of each said chain guide extends through an imaginary plane in which the axis of rotation of said driving sprocket lies, and a part of each said chain pressing portion facing the chain has a concave curvature, wherein the profile of the tip of each said chain pressing portion as seen along a line extending through the pressing portions of both chain guides is tapered, and wherein the chain pressing portion of each of said chain guides has side walls spaced from each other along a direction parallel to the axis of rotation of said one of said sprockets, and wherein a part of the chain is disposed between the side walls of each said chain pressing portion.

12. The chain guide mechanism according to claim 11, wherein said gap between the pressing portion and the chain is substantially uniform when the chain-engaging guiding surfaces are in sliding engagement with the chain while the chain transmission is in operation.

\* \* \* \* \*